Jan. 10, 1928.
1,655,412
E. P. DONNELLAN
MACHINE FOR ASSORTING AND COUNTING COINS
Filed Dec. 22, 1926   5 Sheets-Sheet 1
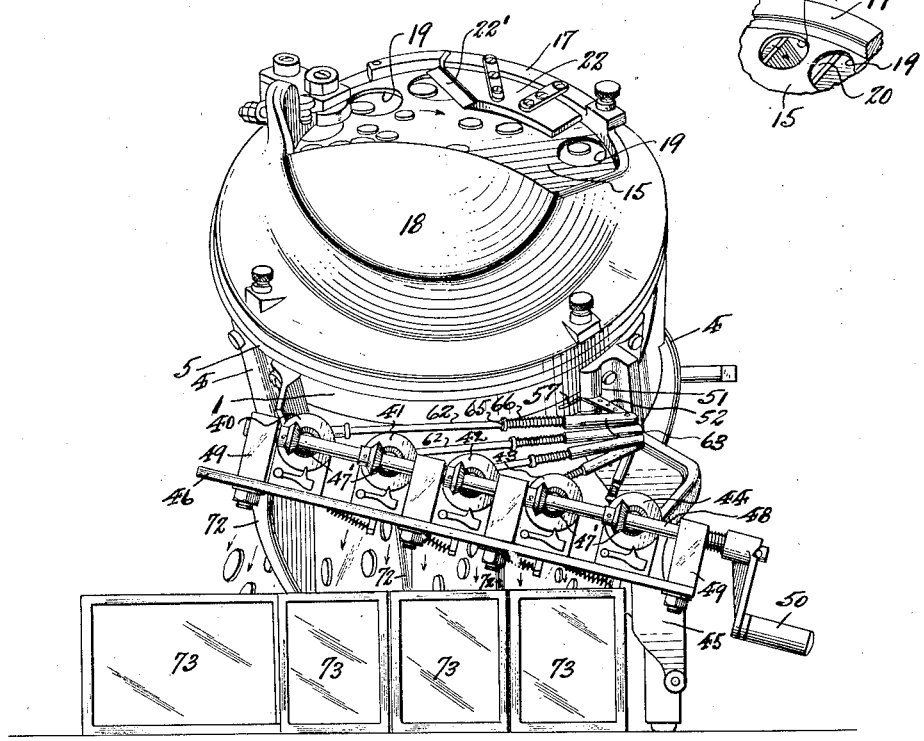
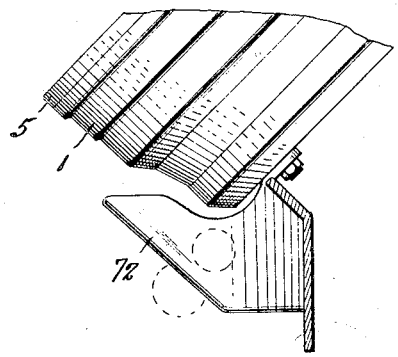
INVENTOR
Edward P. Donnellan,
BY
Frantzel and Richards,
ATTORNEYS Jan. 10, 1928.  1,655,412

E. P. DONNELLAN

MACHINE FOR ASSORTING AND COUNTING COINS

Filed Dec. 22. 1926    5 Sheets-Sheet 2

INVENTOR
Edward P. Donnellan,
BY
Krautzel and Richards
ATTORNEYS

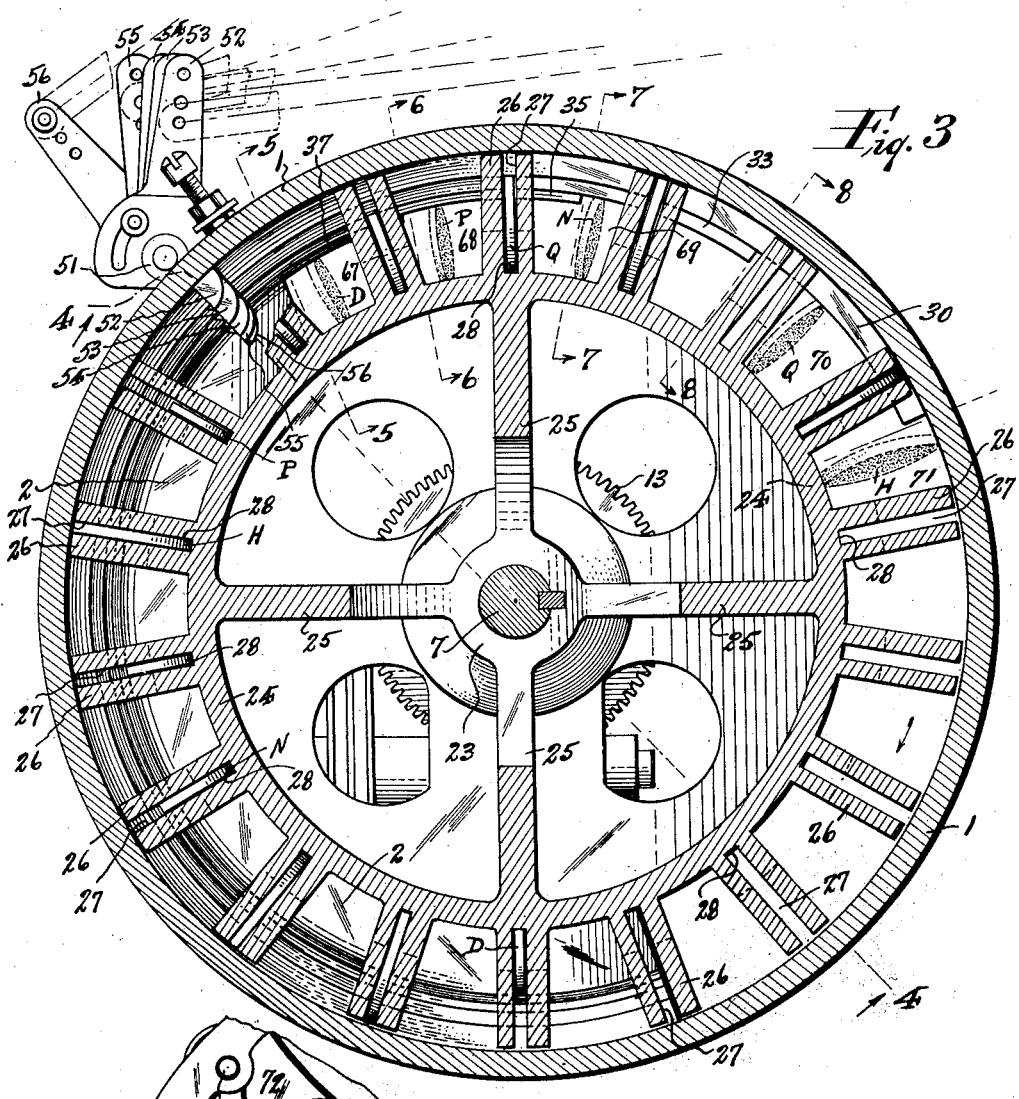

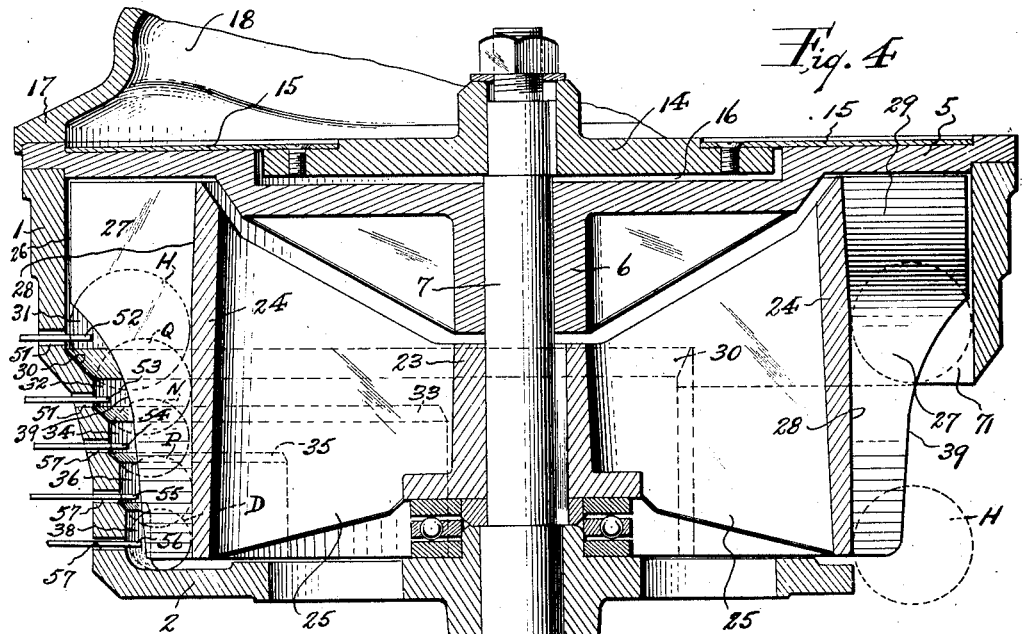
Fig. 4
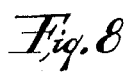
Fig. 5   Fig. 8
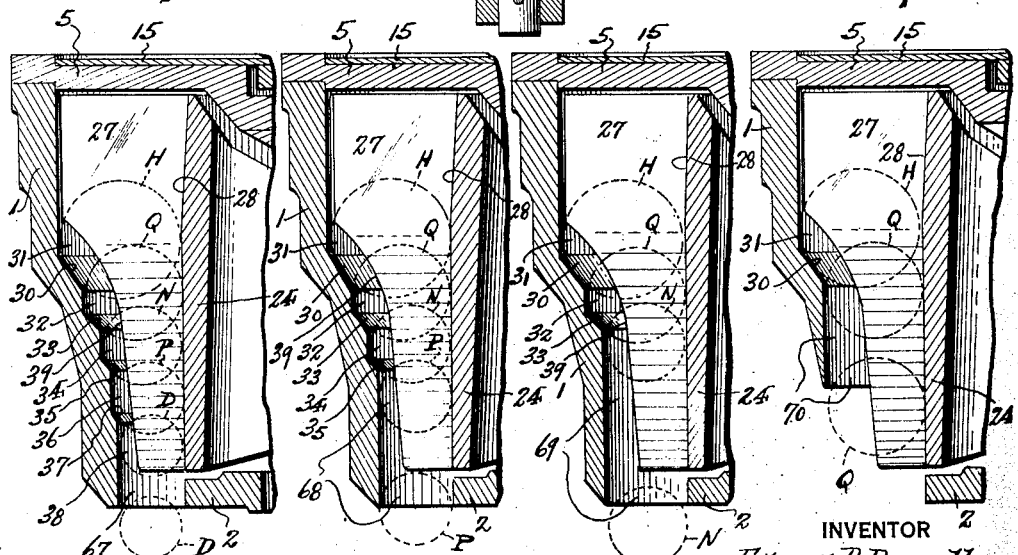
Fig. 6   Fig. 7

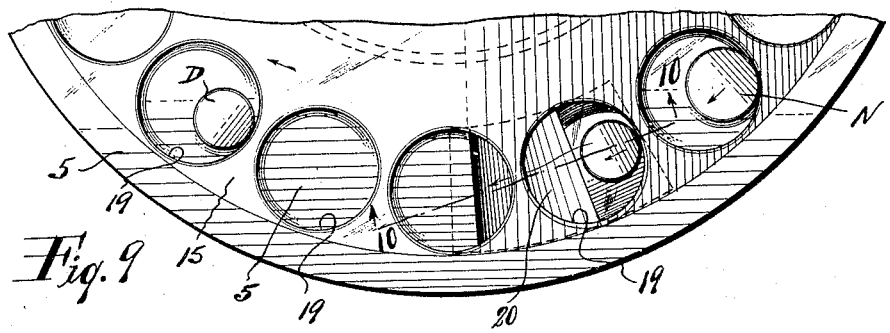
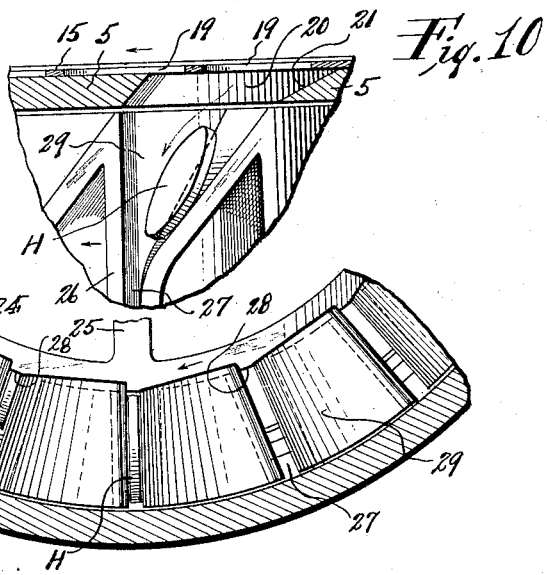
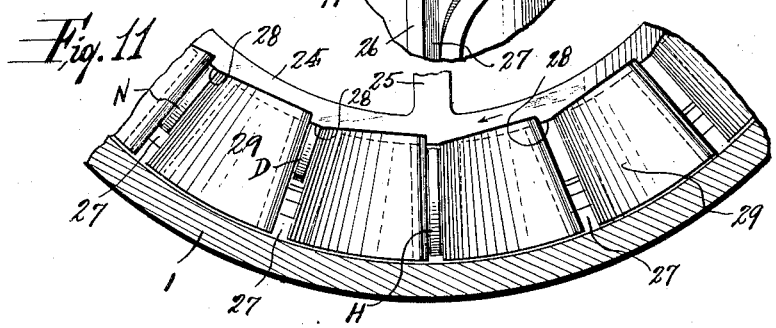
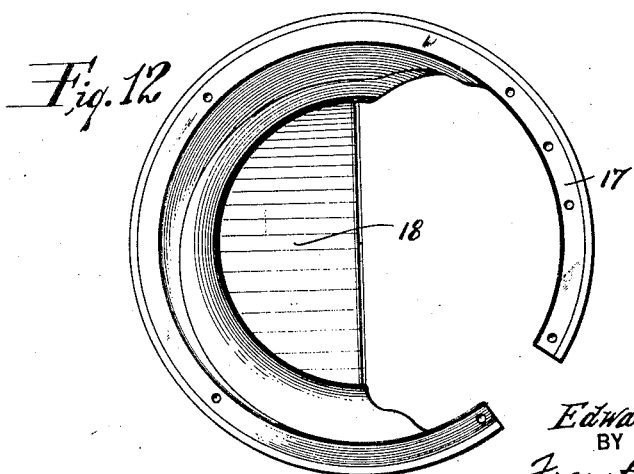

Patented Jan. 10, 1928.

1,655,412

UNITED STATES PATENT OFFICE.

EDWARD P. DONNELLAN, OF BROOKLYN, NEW YORK, ASSIGNOR TO STANDARD-JOHNSON COMPANY, INC., OF BROOKLYN, NEW YORK, A CORPORATION OF NEW YORK.

MACHINE FOR ASSORTING AND COUNTING COINS.

Application filed December 22, 1926. Serial No. 156,484.

This invention, relates to machines for assorting and counting coins; and the invention has reference, more particularly, to a novel construction of machine adapted to both assort and count coins of mixed denominations by a single operation and by substantially a single instrumentality, in connection with which both the functions of sorting and counting are carried out in a substantially simultaneous manner.

So far as I am aware, devices heretofore provided for handling coins have involved two separate and distinct mechanisms; one for sorting the coins, and another for counting the coins after they have been sorted. Such devices have been employed in some cases as independent units, and in other cases have been so related that the sorting mechanism would feed the sorted coins to individual counting mechanisms, corresponding to each denomination of coin handled.

My present invention has for its principal object to provide a machine of such novel character and arrangement, that both the function of sorting and the function of counting may be substantially simultaneously carried on in a single or unitary mechanism of very simple, compact and relatively inexpensive construction; thus reducing the amount of handling to which the coins are subjected, saving both time and labor, and economizing the consumption of power, all of which tends to reduce the cost of handling to a minimum.

Other objects of the present invention, not at this time more particularly enumerated, will be clearly understood from the following detailed description of the same.

The invention is clearly shown in the accompanying drawings, in which:—

Figure 2:
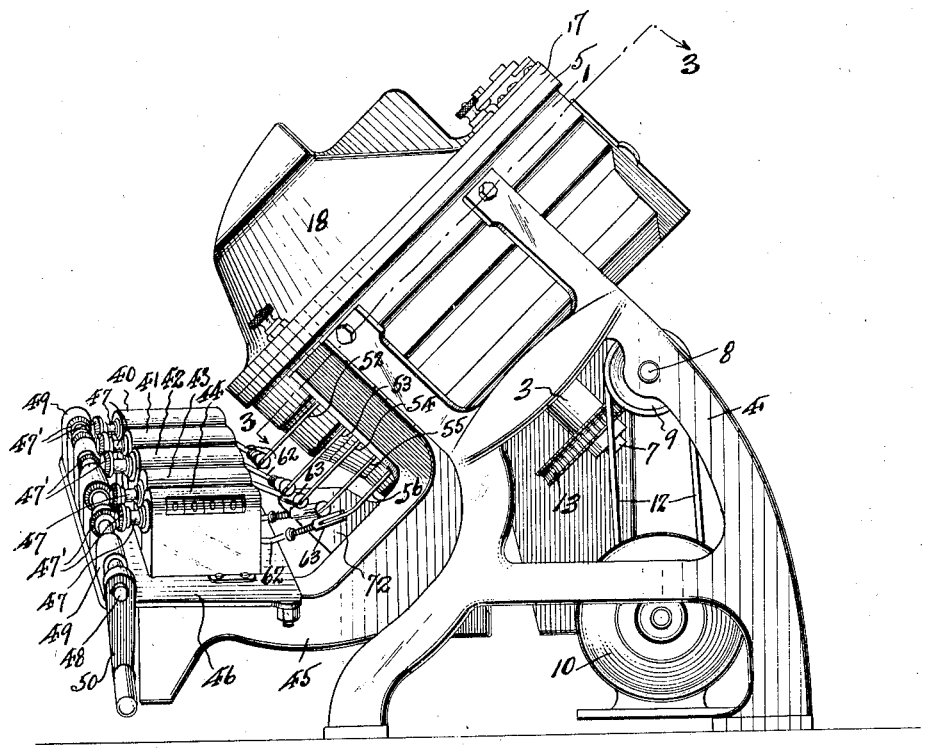
Figure 15:
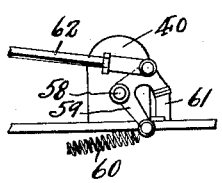
Figure 16:
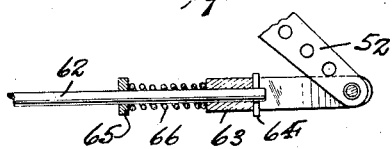

Figure 1 is a front elevation of the novel coin handling machine made according to and embodying the principles of this invention; Figure 2 is a side elevation of the same; Figure 3 is a horizontal section through the body of the machine on line 3—3 in Figure 2, the same being drawn on an enlarged scale, and the supporting framework therefor being omitted; Figure 4 is a fragmentary vertical section, taken on line 4—4 in said Figure 3; Figures 5, 6, 7 and 8 are respectively fragmentary vertical sections respectively taken on lines 5—5, 6—6, 7—7, and 8—8 in said Figure 3; Figure 9 is a fragmentary plan view of the coin feeding means; Figure 10 is a fragmentary transverse vertical section, taken on line 10—10 in Figure 9; Figure 11 is a fragmentary top end view of the coin carrier of the machine;
Figure 12 is a bottom plan view of the hopper of the coin feeding means, drawn on a reduced scale; Figure 13 is a fragmentary side elevation showing a partition means to divide the discharge paths of coins delivered from the machine; Figure 14 is a fragmentary side elevation showing the discharge paths of the quarter and half dollar coins; Figure 15 is a fragmentary end view of a counter device, showing the connection of the actuating levers therewith; Figure 16 is a plan view of other parts of the actuating levers for the counter devices; and Figure 17 is a fragmentary perspective of the delivery point of the coin feeding means.

Similar characters of reference are employed in the hereinabove described views, to indicate corresponding parts.

In the embodiment of my invention, as illustrated in the above described figures of the drawings, the reference character 1 indicates the main body of the machine which comprises a substantially cylindrical member, open at its upper end but having a bottom wall 2 in which is formed a centrally located bearing portion 3. Suitable supporting frame members 4 are provided for attachment to the sides of said main body 1, in such manner that the same is supported in an angularly disposed position, so that it slopes, preferably, at an angle of approximately forty-five degrees from horizontal plane. Suitably secured to and extending across the upper open end of said main body 1 is a top-plate 5, which is also provided with a central bearing portion 6 aligned with the bearing portion 3 of said main body.

Journaled in said aligned bearing portions 3 and 6 is a rotatable spindle 7. Mounted in connection with said supporting frame members 4, to extend beneath said main body 1, is a transverse driven shaft 8, the same being provided with a driven pulley 9. Suitably supported in connection with the frame members 4 is an electric motor 10, on the armature shaft of which is fixed a drive pulley 11, which drives a transmission belt 12 arranged to run over and drive said driven pulley 9 and the shaft 8. A worm and gear transmission means 13 operatively interconnects said driven shaft 8 with said rotatable spindle 7 whereby operating power is transmitted from the former to the latter. It will be understood that the transmission means for driving said spindle 7 may be variously modified, and also that sources of power other than an electric motor may be employed; the above described power transmission arrangement being merely illustrative of a preferred form thereof.

Fixed on the upper end of said spindle 7, above said top-plate 5 is the hub-plate 14 of a feed-disc 15, the latter rotating slidingly on the upper surface of said top-plate 5. Preferably said feed-disc 15 is of a thickness approximating the thickness of the larger denominations of coins, the hub-plate 14 being of more substantial thickness, and consequently being countersunk in a depressed central seat 16 with which the top-plate 5 is provided. Suitably secured to the marginal portions of said top-plate 5, and so as to surround the circumferential edge of said feed-disc 15, is the rim 17 of a feed-hopper 18 which extends over the lower portion of the downwardly sloping top-plate and associated feed-disc, but so as to leave open or exposed the upper portion of said parts, and so as to permit of the introduction into said hopper of batches of mixed coins to be sorted and counted. Preferably I desire to employ a type of feed-hopper member such as that illustrated and described in my copending application Ser. No. 109,034/25, filed on or about May 14, 1926.

That portion of the feed-disc 15 which overlies and slidingly moves over the top-plate 5 is provided with an annular row of coin-receiving openings 19 of diameter large enough to receive coins of the largest denomination or size contained in the mixed coins to be sorted and counted. Said top-plate 5 is provided in a suitable location, and so as to lie in the path of movement and beneath the perforate portion of said feed-disc 15, with a single feed-delivery opening 20, the take-off end of which is preferably downwardly and forwardly beveled, as indicated at 21 in Figure 10 of the drawings. Suitably fixed to the feed-hopper rim 17, with its chamfered deflecting end 22' in advance of said feed-delivery opening 20, and so that it overhangs the perforate portion of said feed-disc 15, is a sheer-plate 22 which functions to remove excess coins so as to assure that the openings 19 of the feed-disc will each convey but a single coin at a time to the feed-delivery opening 20 of said top-plate.

Fixed on said spindle 7 so as to be rotated thereby within said main body 1 and beneath said top-plate 5 is a coin-carrier, comprising a hub-member 23 and a cylindrical member 24 concentric to the main body 1 and connected with said hub-member by spider arms 25. Said cylindrical member 24 is provided with a plurality of outwardly radiating carrier members 26, extending from said cylindrical member toward the wall of said main body 1. Each carrier member 26 is provided with a coin receiving slot 27 extending vertically downward from the upper to the lower end of the carrier member, each of said slots being closed at its inner side throughout its length by a substantially straight wall 28, but being open at its outer side throughout its length toward the wall of said body member 1. The upper receiving ends of said coin receiving slots 27 are provided with funnel like mouths 29 rearwardly flared relative to the direction of rotation of the coin carrier, whereby coins passing through said feed-delivery opening 20 are guided or turned from substantially flat or horizontal position which they occupy in the feed mechanism to edgewise or vertical standing position within the coin receiving slots 27. The number of coin receiving slots 27 with which the coin carrier is provided corresponds to the number of coin-receiving openings 19 with which the feed-disc 15 is provided, and since the coin carrier and feed-disc rotate together, being each driven by the common spindle 7, the same are so related that as a coin-receiving opening 19 of the feed-disc 15 passes over the feed-delivery opening 20, a corresponding coin receiving slot 27 of the carrier passes beneath said feed-delivery opening 20, whereby the mixed coins are successively fed by former, just as they happen to come regardless of their individual denominations, so as to be delivered singly into successive coin receiving slots 27 of the carrier.

The walls of said main body 1 are so formed in opposition to the coin-carrier as to provide a series of separate annular runways at different vertically spaced levels, and respectively corresponding to the respective denominations or sizes of coins to be sorted and counted. Intermediate the top and bottom of the main body 1 its side wall is provided with an inwardly off-set annular shoulder 30 which forms a stop for the coin of largest diameter, e. g. half-dollar coins. Above this shoulder 30 the space between the wall of said main body 1 and the inner straight walls 28 of the coin receiving slots 27 is slightly in excess of the diameters of said half-dollar coins H, and provides a top-most or half-dollar runway 31. Below the shoulder 30, the side wall of said main body 1 is formed to provide a vertical wall section spaced outwardly from the inner straight wall 28 of the coin receiving slots 27 for a distance slightly in excess of the diameters of the next largest coin, viz, quarter-dollars Q, thus providing a quarter-dollar runway 32 in a plane below said half-dollar runway 31, said runway 32 being bounded at its lower end by an inwardly off-set shoulder 33 forming the stop for said quarter-dollars Q. Below the shoulder 33, the side wall of said main body 1 is formed to provide a vertical wall section spaced outwardly from the inner straight walls 28 of the coin receiving slots 27 for a distance slightly in excess of the diameters of the next size of coin, viz, nickels N, thus providing a nickel runway 34 in a plane below said quarter-dollar runway 32, said nickel runway 34 being bounded at its lower end by an inwardly off-set shoulder 35 forming the stop for nickels N. Below the shoulder 35, the side wall of said main body 1 is further formed to provide a vertical section spaced outwardly from the inner straight walls 28 of the coin receiving slots 27 for a distance slightly in excess of the diameters of the next smaller coin, viz, pennies P, thus providing a penny runway 36 in a plane below said nickel runway 34, said penny runway being bounded at its lower end by another inwardly off-set shoulder 37 forming the stop for pennies P. And finally, below the shoulder 37, the side wall of said main body 1 is formed to provide a last vertical wall section spaced outwardly from the inner straight walls 28 of the coin receiving slots 27 for a distance slightly in excess of the diameters of the smallest size of coin, viz, dimes D, thus providing a dime runway 38 in a plane below said penny runway 36, said dime runway 38 being bounded at its lower end by the bottom wall 2 of said main body 1 which forms the stop for dimes D. The outer free edges of the carrier members 26 are cut back as at 39, to reduce the width thereof in correspondence to the progressively reduced widths of the succeeding coin runways 31, 32, 34, 36, and 38 above described. From the above description, and an inspection more particularly of Figures 4 to 8 inclusive of the drawings, it will be quite apparent, that a coin of any denomination may be deposited in a coin receiving slot 27, and when so deposited it will gravitate in the latter until stopped in the particular runway corresponding to its size, the smaller coins unobstructedly passing downwardly through the wider runways, while the larger coins are arrested by the stops defining the bottoms of the runways corresponding thereto. In this manner, each coin entered in the coin-carrier is at once deposited or positioned in a path of travel dedicated solely to coins of its particular denomination or size and no other, the coins of each denomination being thus automatically segregated regardless of the order in which they may be delivered by the coin feeding means. Such an arrangement is of first importance in the present invention, since it is due thereto that it is possible to count and separately register the count of each particular denomination of coin while it is thus being assorted, and prior to final discharge from the machine, and also regardless of the particular order in which the sucessive coins of the several denominations or sizes thereof may be delivered into and discharged from the coin-carrier.

The means for separately counting and registering the count of each particular denomination of coin comprises a set of counting registers of any well known type or style, comprising, for example, a half-dollar register 40, a quarter-dollar register 41, a nickel register 42, a penny register 43 and a dime register 44. The supporting frame-members 4 are provided with suitably formed forwardly projecting bracket arms 45 upon and between which is mounted a register base-plate 46 upon which the several registers are secured in spaced apart side by side relation, and arranged in the order in which they are above described from the left end to the right end of said base-plate 46. Preferably the mounting of the base-plate 46 is such that it inclines downwardly from its left toward its right end, whereby the registers are substantially positioned in different vertically spaced planes corresponding more or less to the planes which the different denominations of the coins occupy in the coin-carrier. Said coin registers are preferably of the re-setting type, and their resetting shafts 47 are each connected by suitable gearing 47' with a manually rotatable control or actuating shaft 48, which is journaled in bearings 49 secured on said base-plate. Said control or actuating shaft 48 is provided at one end with a suitably connected crank-handle 50 for turning the same to re-set the registers at desired times. Suitably secured in connection with the exterior side of said main body 1 is a fulcrum block 51, in connection with which are pivotally mounted a series of vertically spaced apart trip-levers, comprising a half-dollar trip lever 52, a quarter-dollar trip-lever 53, a nickel trip-lever 54, a penny trip-lever 55 and a dime trip-lever 56. The wall of the main body 1 of the machine is provided with slots 57 respectively communicating with the several runways 31, 32, 34, 36 and 38 corresponding to the several denominations of coins. The inner ends of the several trip-levers 52, 53, 54, 55 and 56 respectively extend through said slots 57 so as to respectively enter the runways 31, 32, 34, 36 and 38, to thus lie in the paths of the coins propelled through said runways by the coin-carrier. Each register 40, 41, 42, 43 and 44 possesses an actuating spindle 58 for operating its register wheels. Fixed on the exterior end of each actuating spindle 58 is a bell-crank actuator 59, which is retained in normal position by a pull-spring 60 against a stop 61 (see Figure 15). The bell-crank actuator 59 of the several registers 40, 41, 42, 43 and 44 are connected respectively with the outer ends of the several trip-levers 52, 53, 54, 55 and 56 by connecting rods or links 62. Preferably each link 62 is provided with a slide-yoke connection 63 pivotally engaged with the associated trip-lever, said slide-yoke connection 63 being normally engaged with a stop-pin 64 with which the link 62 is provided, whereby the pull of the trip-lever, when moved in proper direction, is transmitted to said link 62. Fixed on said link 62 rearwardly of said slide-yoke connection 63 is a collar 65 between which and the said slide-yoke connection 63 is arranged a compression spring 66, all as shown more particularly in Figure 16. The purpose of this arrangement is to prevent injury to the coin register devices, should the trip-levers be accidentally turned in a reverse direction, in which event the slide-yoke connection 63 would slide rearwardly on the links 62 against the tension of the springs 66, without transmitting any motion to said links.

Beyond the position of the trip-levers, the bottom and sides of the main body 1 is progressively cutaway to provide coin delivery openings through which the sorted and counted coins may drop into suitable receptacles placed beneath the machine for their reception. The bottom wall 2 beneath the dime runway 38 is thus provided with a dime discharge opening 67. Beyond the dime discharge opening 67, the stop shoulder 37 is cutaway to provide a wider penny discharge opening 68. Beyond the penny discharge opening, the stop shoulder 35 is cut away to provide a further widened nickel discharge opening 69. Beyond the nickel discharge opening, the stop shoulder 33 is cut away to provide a wider quarter discharge opening 70; and finally, beyond the quarter discharge opening, the stop-shoulder 30 is cut away to provide the widest or half-dollar discharge opening 71; all of which will be understood from an inspection of Figures 3 to 8 inclusive.

Beneath said main body 1 suitable dividing partitions 72 may be provided to form drop-wells or ways aligned with the respective coin discharge openings above described, and beneath which may be placed receptacles 73 to receive the delivered coins.

In operation, a quantity of mixed coins, containing, for example, half-dollars, quarters, nickels, pennies and dimes, are placed within the feed-hopper 18, and, the machine being in motion, the feed-disc 15 is rotated, whereby coins which lodge in the receiving openings 19 of the latter are carried along thereby toward the delivery opening 20 of the top-plate 5. As each opening 19 moves across the said delivery opening 20, the conveyed coin will drop into a receiving slot 27 of the synchronously rotated coin carrier. If the coin thus delivered is a half-dollar, the same upon deposit in the receiving slot of the carrier will be stopped by the shoulder 30 of the main body, and will be caused to move around the half-dollar runway 31 while being held in cross-wise relation thereto by the carrier member 26; if the coin is a quarter, it will drop through the half-dollar runway but will be stopped by the shoulder 33, and will be caused to move around the quarter dollar runway 32; if the coin is a nickel, it will drop through the larger coin runways for half and quarter dollars but will be stopped by the shoulder 35, and will be caused to move around the nickel runway 34; if the coin is a penny it will be stopped by the shoulder 37 after dropping through the runways for larger coins and will be caused to move around the penny runway 36; and if the coin is a dime it will be stopped by the bottom 2 of the main body 1 after dropping through the levels of the runways for larger coins and will be caused to move around the dime runway 38. It will thus be apparent that as each coin is deposited in the slot 27 of a carrier member 26 it will at once gravitate to a runway of proper size corresponding thereto, no matter in what order the coins may pass from the feed-hopper to the coin-carrier; and, furthermore, each denomination of coin will travel in a separate and distinct plane of movement differing from the plane of movement of the coins of all the other denominations while propelled by the coin carrier. In this manner not only are the coins separated from each other with respect to their size or denomination immediately they enter the coin-carrier, but since they are thus separated and caused to move to their final points of discharge in distinctive planes, each movement may be utilized at the same time to separately count or register the number or value, as the case may be, of each denomination of coin. The counting is effected as follows: Each coin is held by a carrier member 26 in cross-wise relation to its runway as it is moved therethrough, and consequently the same, during such travel, is caused to engage in passing the trip-lever effective for coins of its particular denomination, which trip-lever projects into its runway so as to lie in its path of movement, but out of the path of movement of coins of all other denominations. The passing engagement of the coin with the trip-lever cooperating with its runway, swings the trip-lever on its fulcrum, which movement is transmitted through a link 62 to the proper register, the latter being thus actuated by the passing of each coin of corresponding denomination, all of which will be clearly apparent from an inspection of Figures 3 and 4 of the drawings. After the coins have passed the register actuating trip-levers, they are moved to their proper discharge openings, through which they are released by gravity to pass into their respective receiving receptacles.

From the above description it will be clearly evident that this invention provides a very simple, compact and efficient machine operative to both sort and count mixed coins by practically a simultaneous operation, thus saving double handling or re-handling, and effecting a saving of wear and tear on the coins themselves.

It will also be understood that should it be desired to use the machine as a sorter without counting the coins, the counting mechanism be omitted.

In the accompanying drawings I have shown my invention and have described the same in the above specification merely in a preferred form and by way of example, but obviously many alterations and variations may be made therein and in its mode of application, which will still be comprised within its spirit. Generally speaking, I desire it to be understood that I do not limit myself to any specific form or embodiment, except in so far as is specified in the here following claims.

I claim:—

1. In a machine of the kind described, a main body formed internally to provide a series of vertically spaced annular coin runways corresponding to coins of several denominations, a rotary coin carrier within said body to hold coins in and propel the same through said runways, means for delivering coins to said coin carrier, and said main body having a series of coin discharge openings respectively corresponding to and in communication with said coin runways.

2. In a machine of the kind described, a main body formed internally to provide a series of vertically spaced annular coin runways corresponding to coins of several denominations, a rotary coin carrier within said body to hold coins in and propel the same through said runways, means for delivering coins to said coin carrier, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and said main body having beyond said trip-levers a series of coin discharge openings respectively corresponding to and in communication with said coin runways.

3. In a machine of the kind described, a main body formed internally to provide a series of vertically spaced annular coin runways corresponding to coins of several denominations, a top-plate having a single coin delivery opening, a rotary coin-carrier within said body beneath said top-plate to hold coins in and propel the same through said runways, a perforate feed-disc rotatably slidable on said top-plate, a feed-hopper within which said feed-disc moves, means to rotate said feed-disc and coin-carrier whereby coins are fed by the former through said coin delivery opening to the latter, and said main body having a series of coin discharge openings respectively corresponding to and in communication with said coin runways.

4. In a machine of the kind described, a main body formed internally to provide a series of vertically spaced annular coin runways corresponding to coins of several denominations, a top-plate having a single coin delivery opening, a rotary coin-carrier within said body beneath said top-plate to hold coins in and propel the same through said runways, a perforate feed-disc rotatably slidable on said top-plate, a feed-hopper within which said feed-disc moves, means to rotate said feed-disc and coin-carrier whereby coins are fed by the former through said coin delivery opening to the latter, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and said main body having beyond said trip-levers a series of coin discharge openings respectively corresponding to and in communication with said coin runways.

5. In a machine of the kind described, a cylindrical main body formed on the interior of its side walls with successive inwardly off-set annular stop shoulders vertically spaced from the top to the bottom thereof to form coin runways progressively diminished in width to correspond to the diameters of coins of different denominations, a concentric rotary coin carrier within said main body having a plurality of vertically disposed radial slots in its outer marginal portions, said slots of said carrier being open from end to end and also toward said coin runways whereby coins of different denominations deposited in said slots are both held in and propelled through runways corresponding thereto, means for delivering coins successively into the slots of said carrier, and the bottom and side stop shoulders of said main body being progressively cut away in the direction of rotation of said coin carrier to provide successively enlarged coin discharge openings corresponding in width to and leading from the several coin runways.

6. In a machine of the kind described, a cylindrical body formed on the interior of its side wall with successive inwardly off-set annular stop shoulders vertically spaced from the top to the bottom thereof to form coin runways progressively diminished in width to correspond to the diameters of coins of different denominations, a concentric rotary coin carrier within said main body having a plurality of vertically disposed radial slots in its outer marginal portions, said slots of said carrier being open from end to end and also toward said coin runways whereby coins of different denominations deposited in said slots are both held in and propelled through runways corresponding thereto, means for delivering coins successively into the slots of said carrier, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and the bottom and side stop-shoulders of said main body being progressively cut away in the direction of rotation of said coin carrier to provide successively enlarged coin discharge openings corresponding in width to and leading from the several coin runways.

7. In a machine of the kind described, a cylindrical main body formed on the interior of its side wall with successive inwardly off-set annular stop-shoulders vertically spaced from the top to the bottom thereof to form coin runways progressively diminished in width to correspond to the diameters of coins of different denominations, a top-plate on said main body having a single coin delivery opening, a concentric rotary coin carrier within said main body having a plurality of vertically disposed radial slots in its outer marginal portions, said slots of said carrier being open from end to end and also toward said coin runways whereby coins of different denominations deposited in said slots are both held in and propelled through runways corresponding thereto, a perforate feed-disc rotatably slidable on said top-plate, a feed-hopper within which said feed-disc moves, means to rotate said feed-disc and coin carrier whereby coins are fed by the former through said coin delivery opening to the latter, and the bottom and side stop shoulders of said main body being progressively cut away in the direction of rotation of said coin carrier to provide successively enlarged coin discharge openings corresponding in width to and leading from the several coin runways.

8. In a machine of the kind described, a cylindrical main body formed on the interior of its side wall with successive inwardly off-set annular stop-shoulders vertically spaced from the top to the bottom thereof to form coin runways progressively diminished in width to correspond to the diameters of coins of different denominations, a top-plate on said main body having a single coin delivery opening, a concentric rotary coin carrier within said main body having a plurality of vertically disposed radial slots in its outer marginal portions, said slots of said carrier being open from end to end and also toward said coin runways whereby coins of different denominations deposited in said slots are both held in and propelled through runways corresponding thereto, a perforate feed-disc rotatably slidable on said top-plate, a feed-hopper within which said feed-disc moves, means to rotate said feed-disc and coin carrier whereby coins are fed by the former through said coin delivery opening to the latter, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and the bottom and side stop-shoulders of said main body being progressively cut away in the direction of rotation of said coin carrier to provide successively enlarged coin discharge openings corresponding in width to and leading from the several coin runways.

9. In a machine of the kind described, a substantially cylindrical angularly inclined main body having a bottom provided with a central bearing, a top-plate also provided with a central bearing, a spindle journaled in said bearings, means for rotating said spindle, a rotary coin carrier fixed on said spindle beneath said top-plate and concentric to the main body, said coin carrier having vertically disposed radial slots in its marginal portions which are open from end to end and toward the sides of said main body, the walls of the upper ends of said slots diverging to provide funnel-like receiving mouths, said top-plate having a single coin delivery opening aligned to the path of movement of said receiving mouths of said coin carrier slots, means to successively deliver coins through said top-plate opening and respectively into successive coin carrier slots, said main body being formed internally to provide for cooperation with said coin carrier a series of annular coin runways in vertically spaced planes and progressively diminished in width from the top to the bottom of said main body, and said main body having a series of coin discharge openings respectively corresponding to and in communication with said coin runways.

10. In a machine of the kind described, a substantially cylindrical angularly inclined main body having a bottom provided with a central bearing, a top-plate also provided with a central bearing, a spindle journaled in said bearings, means for rotating said spindle, a rotary coin carrier fixed on said spindle beneath said top-plate and concentric to the main body, said coin carrier having vertically disposed radial slots in its marginal portions which are open from end to end and toward the sides of said main body, the walls of the upper ends of said slots diverging to provide funnel-like receiving mouths, said top-plate having a single coin delivery opening aligned to the path of movement of said receiving mouths of said coin carrier slots, means to successively deliver coins through said top-plate opening and respectively into successive coin carrier slots, said main body being formed internally to provide for cooperation with said coin carrier a series of annular coin runways in vertically spaced planes and progressively diminished in width from the top to the bottom of said main body, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and said main body having beyond said trip-levers a series of coin discharge openings respectively corresponding to and in communication with said runways.

11. In a machine of the kind described, a substantially cylindrical angularly inclined main body having a bottom provided with a central bearing, a top-plate also provided with a central bearing, a spindle journaled in said bearings, means for rotating said spindle, a rotary coin carrier fixed on said spindle beneath said top-plate and concentric to the main body, said coin carrier having vertically disposed radial slots in its marginal portions which are open from end to end and toward the sides of said main body, the walls of the upper ends of said slots diverging to provide funnel-like receiving mouths, said top-plate having a single coin delivery opening aligned to the path of movement of said receiving mouths of said coin carrier slots, a feed-disc also fixed on said spindle and rotatably slidable on said top-plate, said feed-disc having coin engaging openings corresponding in number and position to the coin carrier slots whereby coins are fed through said coin delivery opening into the latter, a feed-hopper within which said feed-disc moves, said main body being formed internally to provide for cooperation with said coin carrier a series of annular coin runways in vertically spaced planes and progressively diminished in width from the top to the bottom of said main body, and said main body having a series of coin discharge openings respectively corresponding to and in communcation with said coin runways.

12. In a machine of the kind described, a substantially cylindrical angularly inclined main body having a bottom provided with a central bearing, a top-plate also provided with a central bearing, a spindle journaled in said bearings, means for rotating said spindle, a rotary coin carrier fixed on said spindle beneath said top-plate and concentric to the main body, said coin carrier having vertically disposed radial slots in its marginal portions which are open from end to end and toward the sides of said main body, the walls of the upper ends of said slots diverging to provide funnel-like receiving mouths, said top-plate having a single coin delivery opening aligned to the path of movement of said receiving mouths of said coin carrier slots, a feed-disc also fixed on said spindle and rotatably slidable on said top-plate, said feed-disc having coin engaging openings corresponding in number and position to the coin carrier slots whereby coins are fed through said coin delivery opening into the latter, a feed-hopper within which said feed-disc moves, said main body being formed internally to provide for cooperation with said coin carrier a series of annular coin runways in vertically spaced planes and progressively diminished in width from the top to the bottom of said main body, a series of counting registers corresponding respectively to the several denominations of coins, a series of pivoted trip-levers respectively having their inner ends projected into the respective coin runways to lie in the path of movement of coins propelled therethrough, means operatively connecting said trip-levers respectively with the respective counting registers, and said main body having beyond said trip-levers a series of coin discharge openings respectively corresponding to and in communication with said coin runways.

13. In a machine of the kind described, a main body formed internally to provide a series of annular coin runways of varying width vertically spaced in different planes, a rotary slotted coin carrier within said main body adapted to receive and carry coins in up-standing cross-wise relation to said coin-runways.

14. In a machine of the kind described, a main body formed internally to provide a series of annular coin runways of varying width vertically spaced in different planes, a rotary slotted coin carrier within said main body adapted to receive and carry coins in up-standing cross-wise relation to said coin-runways, means for delivering coins to said coin carrier, and said main body having a series of coin discharge openings respectively corresponding to and in communication with said coin runways.

15. In a machine of the kind described, a main body formed internally to provide a series of annular coin runways of varying width vertically spaced in different planes, a rotary slotted coin carrier within said main body adapted to receive and carry coins in up-standing cross-wise relation to said coin-runways, means for delivering coins to said coin carrier, a series of counting registers corresponding to said runways, register actuating means arranged to project into said runways to lie in the path of movement of coins therein so as to be operated by coins passing therethrough, and said main body having a series of coin discharge openings respectively corresponding to and in communication with said coin runways.

16. In a machine of the kind described, a main body formed internally to provide a series of annular coin runways of varying width vertically spaced in different planes, a top-plate having a single coin delivery opening, a rotary slotted coin carrier within said main body adapted to receive and carry coins in up-standing cross-wise relation to said coin carrier, a perforate feed-disc rotatable slidable on said top-plate, a feed-hopper to supply coins to said feed disc, means to rotate said feed-disc and coin-carrier in timed relation whereby coins are fed by the former to the latter through said coin delivery opening of said top-plate, and said main body having a series of coin discharge openings respectively corresponding to and in communication with said coin runways.

17. In a machine of the kind described, a main body formed internally to provide a series of annular coin runways of varying width vertically spaced in different planes, a top-plate having a single coin delivery opening, a rotary slotted coin carrier within said main body adapted to receive and carry coins in up-standing cross-wise relation to said coin carrier, a perforate feed-disc rotatably slidable on said top-plate, a feed-hopper to supply coins to said feed disc, means to rotate said feed-disc and coin-carrier in timed relation whereby coins are fed by the former to the latter through said coin delivery opening of said top-plate, a series of counting registers corresponding to said runways, register actuating means arranged to project into said runways to lie in the path of movement of coins therein so as to be operated by coins passing therethrough, and said main body having a series of coin discharge openings respectively corresponding to and in communication with said coin runways.

In testimony, that I claim the invention set forth above I have hereunto set my hand this 8th day of December, 1926.

EDWARD P. DONNELLAN.